(12) United States Patent
Yarker et al.

(10) Patent No.: US 10,124,544 B2
(45) Date of Patent: Nov. 13, 2018

(54) AUTOMATED FIBER PLACEMENT WITH COURSE TRAJECTORY COMPENSATION

(71) Applicant: CGTech, Irvine, CA (US)

(72) Inventors: Thomas Yarker, St. George, UT (US); William H. Hasenjaeger, Bellingham, WA (US)

(73) Assignee: CGTech, Irvine, CA (US)

( * ) Notice: Subject to any disclaimer, the term of this patent is extended or adjusted under 35 U.S.C. 154(b) by 0 days.

(21) Appl. No.: 15/863,522

(22) Filed: Jan. 5, 2018

(65) Prior Publication Data

US 2018/0257316 A1 Sep. 13, 2018

Related U.S. Application Data

(63) Continuation of application No. 15/406,972, filed on Jan. 16, 2017, now Pat. No. 9,862,153, which is a continuation of application No. 14/610,569, filed on Jan. 30, 2015, now Pat. No. 9,545,759.

(51) Int. Cl.
| | |
|---|---|
| *B29C 70/38* | (2006.01) |
| *G06F 17/50* | (2006.01) |
| *B29C 70/02* | (2006.01) |
| *B29L 31/30* | (2006.01) |

(52) U.S. Cl.
CPC ............ *B29C 70/382* (2013.01); *B29C 70/02* (2013.01); *B29C 70/38* (2013.01); *G06F 17/50* (2013.01); *G06F 17/5009* (2013.01); *B29L 2031/30* (2013.01); *G06F 2217/44* (2013.01)

(58) Field of Classification Search
CPC .............................. B29C 70/382; B29C 70/38
See application file for complete search history.

(56) References Cited

U.S. PATENT DOCUMENTS

| | | | | |
|---|---|---|---|---|
| 6,752,190 | B1 * | 6/2004 | Boll | B29B 15/08 156/173 |
| 6,799,081 | B1 * | 9/2004 | Hale | B29C 70/382 700/118 |
| 7,376,480 | B2 * | 5/2008 | Hagen | B29C 70/386 156/361 |
| 7,469,735 | B2 * | 12/2008 | Brown | B29C 70/38 156/392 |
| 7,513,965 | B2 * | 4/2009 | Oldani | B29C 70/382 156/64 |
| 7,974,722 | B2 * | 7/2011 | Boyl-Davis | G06F 17/50 264/515 |

(Continued)

*Primary Examiner* — Thomas Randazzo
(74) *Attorney, Agent, or Firm* — Knobbe, Martens, Olson & Bear, LLP

(57) ABSTRACT

Various automated fiber placement systems and methods are disclosed. The system can determine steerable paths for the application of a composite material over highly contoured surfaces. The system can determine when a course trajectory would violate a steering limitation (e.g., a maximum bendability of the composite material) and can adjust the trajectory to avoid such violations. The adjustment can create gaps between adjacent courses, which can have a generally flared peripheral shape. The system can fill such gaps with subsequent courses of the composite material. Thus, the system can automatically apply composite material to highly contoured surfaces while also avoiding violation of the steering limitations.

20 Claims, 11 Drawing Sheets

(56) References Cited

U.S. PATENT DOCUMENTS

| | | | | |
|---|---|---|---|---|
| 8,349,105 | B2* | 1/2013 | Kehrl | B29C 70/207 |
| | | | | 156/64 |
| 8,632,653 | B2* | 1/2014 | Brown | B29C 70/342 |
| | | | | 156/196 |
| 8,932,423 | B2* | 1/2015 | McCarville | B29C 70/30 |
| | | | | 156/196 |
| 8,934,702 | B2* | 1/2015 | Engelbart | B29C 70/38 |
| | | | | 356/237.1 |
| 9,090,028 | B2* | 7/2015 | McCarville | B29C 70/30 |
| 9,278,484 | B2* | 3/2016 | Guzman | B29C 70/207 |
| 9,409,356 | B2* | 8/2016 | Karb | B29B 11/16 |
| 9,694,546 | B2* | 7/2017 | Kisch | B29C 70/38 |
| 2003/0102070 | A1* | 6/2003 | Black | B29C 35/0288 |
| | | | | 156/64 |
| 2003/0145932 | A1* | 8/2003 | Holmes | B23K 26/032 |
| | | | | 156/64 |
| 2007/0187021 | A1* | 8/2007 | Oldani | B29C 35/0288 |
| | | | | 156/166 |
| 2010/0121625 | A1* | 5/2010 | Krog | G06F 17/5004 |
| | | | | 703/6 |
| 2012/0012242 | A1* | 1/2012 | Blonigen | B29C 70/38 |
| | | | | 156/180 |
| 2014/0288893 | A1* | 9/2014 | Blom | G06F 17/5018 |
| | | | | 703/1 |
| 2015/0158208 | A1* | 6/2015 | Williams | B29C 70/388 |
| | | | | 156/275.5 |
| 2016/0076552 | A1* | 3/2016 | Anderson | B29C 70/382 |
| | | | | 416/230 |
| 2016/0082672 | A1* | 3/2016 | Munaux | B29C 70/30 |
| | | | | 156/230 |

* cited by examiner

AUTOMATED FIBER PLACEMENT WITH COURSE TRAJECTORY COMPENSATION

CROSS-REFERENCE TO RELATED APPLICATIONS

This application is a continuation of U.S. patent application Ser. No. 15/406,972, filed on Jan. 16, 2017, which is a continuation of U.S. patent application Ser. No. 14/610,569, filed on Jan. 30, 2015, now U.S. Pat. No. 9,545,759, the entire contents of each of the aforementioned applications is incorporated by reference herein.

BACKGROUND

Field

This disclosure relates to producing components using composite materials, such as by controlling the application of tows of composite material during an automated fiber placement operation.

Description of the Related Art

Composite materials are used for a variety of high-performance applications, such as in aerospace components, automotive parts, and sporting goods A composite material includes at least two constituent materials that are combined to produce a material with characteristics significantly different than the constituent materials individually. Composite materials typically include a bonding agent or matrix (e.g., a glue or resin) and a substrate or reinforcement (e.g., fiberglass, graphite, carbon-fiber, or other fibrous material). Layers of the composite material can be applied to a form that represents the shape of a component, such as a fuselage, turbine cowling, or wing. The composite material is then cured, during which the bonding agent liquefies and flows through the layers of the substrate. The result is a single coherent structure with an excellent strength to weight ratio.

Certain composite components are produced by layering the composite material onto the form with a hand layup technique. This includes cutting flat patterns of composite material and then manually placing or pressing those patterns onto the form. Hand layup requires that the shape of each layer of material be converted from the 3-dimensional piece to be produced into a flat pattern, so that the pattern can be cut. It also requires great amounts of manual labor to orient and apply the patterns to the form.

An advance over hand layup is tape layup, which includes using a machine to apply wide strips (called "tape") of composite material to the form. Typically, the tape is between 25 mm and 200 mm wide and is stored on a spool. During application, the tape travels from the spool to a compaction roller, which presses the material onto the form or onto the previous layers of material. Generally, the compaction roller is mounted on a computer-controlled 5-axis machine (e.g., a CNC machine with the compaction roller instead of a milling cutter). The tape is pulled onto the form by the compaction roller being rolled over the surface of the form. To aid in maintaining the tape in place until curing, the tape can be heated during application and/or can have an adhesive on at least one side. When the tape is applied to a curved surface, one lateral side of the tape experiences compression and the opposite lateral side of the tape experiences tension. This can result in wrinkling, tearing, or warping of the tape and can be exacerbated by the relatively wide width of the tape. Thus, tape layup is typically limited to regular, smooth, and/or relatively flat shapes, such as wing surfaces and cylindrical missile sections.

An advance over tape layup is automated fiber placement (AFP), which includes using a machine to apply rows (called "courses") that are each made up of multiple narrow strips (called "tows") of the composite material. For example, each course can include between 8 and 32 tows, and each tow can be between 3 mm and 12 mm wide. Typically, several tows pass over a compaction roller (also called a "head") generally parallel to each other and can be concurrently applied to a form having the shape of the component to be produced. The compaction roller can be moved relative to the form to steer the application of the tows to a desired area of the form, to provide a desired application pattern of the tows, or otherwise. The application of each tow to the form can be controlled independent of the other tows. For example, each tow can be individually started, stopped, cut, and/or restarted.

SUMMARY

Typically, the AFP technique allows the composite material to be applied to forms having a greater degree of contouring than is achievable with tape layup, yet still avoid a flawing event (e.g., wrinkling, tearing, or warping of at least one of the tows). Nevertheless, when applied to certain highly-contoured shapes, the compression on one side of the tow and/or the tension on the opposite side of the tow can still cause sufficient stress in the tow to result in a flawing event. For example, wrinkling, tearing, or warping can occur when the tow is applied to certain three-dimensional dual curve shapes, such as some saddle shapes.

The present disclosure includes an AFP system that can determine whether a flawing event will occur on a particular course and, if so, can generate an alternate course path to inhibit or avoid such an event. For example, the system can receive information related to the shape and extent of the form, and can generate steering paths (also called "trajectories") for applying courses of tows to the form. The system can analyze some or each of the paths to determine whether one or more of the tows will be asked to exceed a steering limitation, such being applied to a curve with too small a radius of curvature.

If a particular course trajectory is found to violate a steering limitation (also called a "steering violation"), the system can determine an alternate trajectory for that course. Typically, a portion of the alternate trajectory extends generally parallel to a previous course, and another portion of the alternate trajectory diverges from the previous course, thereby creating a gap between the two courses. Because the gap typically has a substantially triangular or flared peripheral shape, the alternate trajectory can be called a "flared path." Such a flared path generally avoids, or at least reduces the extent of, the steering violation and thus can reduce the likelihood of the flawing event occurring. Certain embodiments can also determine subsequent courses to fill the gap, thereby avoiding unwanted voids in the layer of composite material.

Accordingly, various embodiments of the system can determine trajectories for the application of courses of composite material to the form. The system can determine whether those courses will incur steering violations and, if so, can compensate by generating alternate trajectories. Further, the system can fill the gap formed by such alternate trajectories by applying additional courses. Such functionality allows the system to automatically apply composite material across the extent of highly-contoured surfaces, while still complying with the steering limitations of the composite material.

Neither the preceding summary nor the following detailed description purports to limit or define the scope of protection. The scope of protection is defined by the claims.

BRIEF DESCRIPTION OF THE DRAWINGS

The abovementioned and other features of the embodiments disclosed herein are described below with reference to the drawings of the embodiments. The illustrated embodiments are intended to illustrate, but not to limit, the scope of protection. Various features of the different disclosed embodiments can be combined to form further embodiments, which are part of this disclosure.

DETAILED DESCRIPTION OF SPECIFIC EMBODIMENTS

Various embodiments of an automated fiber placement (AFP) system 10 are disclosed. As more fully described below, the system 10 can determine steerable paths for the application of a composite material over contoured surfaces. The system 10 can determine whether a course trajectory will violate a limitation (e.g., the maximum amount the composite material can bend without suffering a flaw) and can adjust the trajectory to avoid such a violation. The adjustment can create gaps between adjacent courses, which can have a generally flared peripheral shape. The system 10 can determine subsequent courses of the composite material to fill such gaps. Thus, the system 10 can automatically apply the composite material to highly contoured surfaces while also avoiding violation of the steering limitations.
Overview (FIGS. 1-1D)

Figure 1:
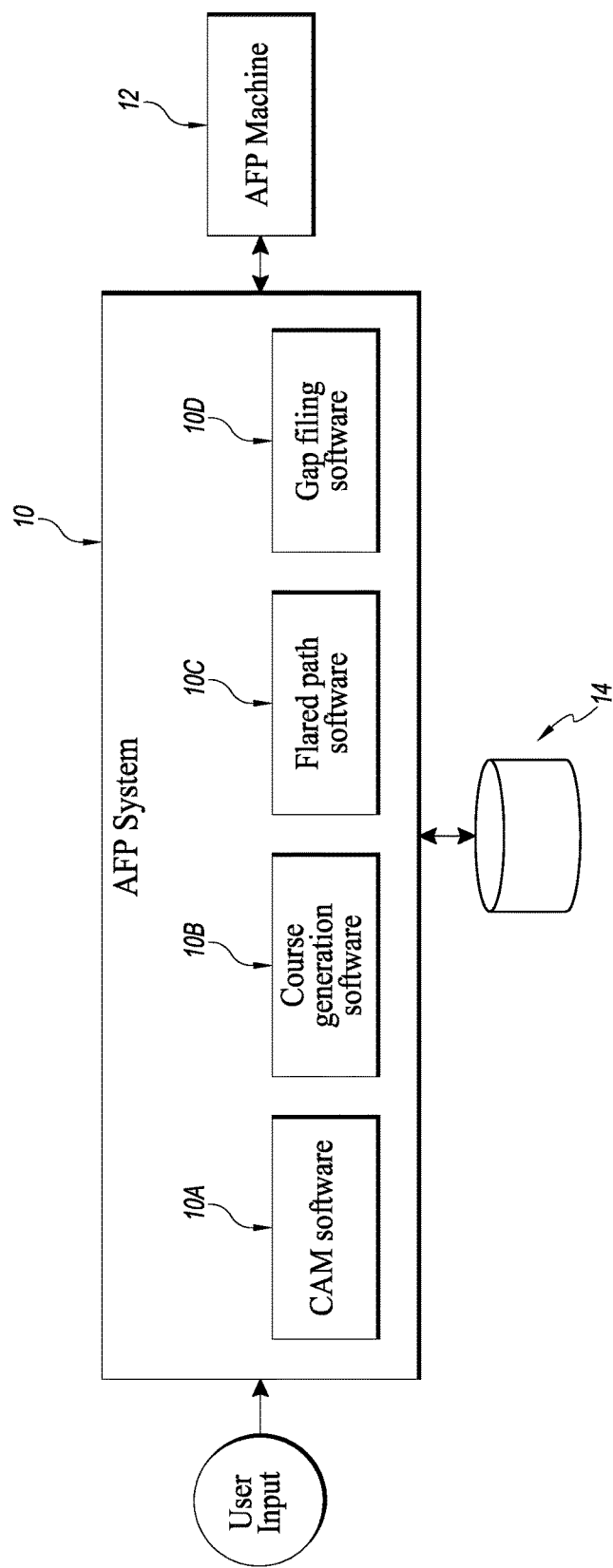
FIG. 1 illustrates an automated fiber placement system, which controls an AFP machine in the application of courses of composite material to a form.
Figure 1A:
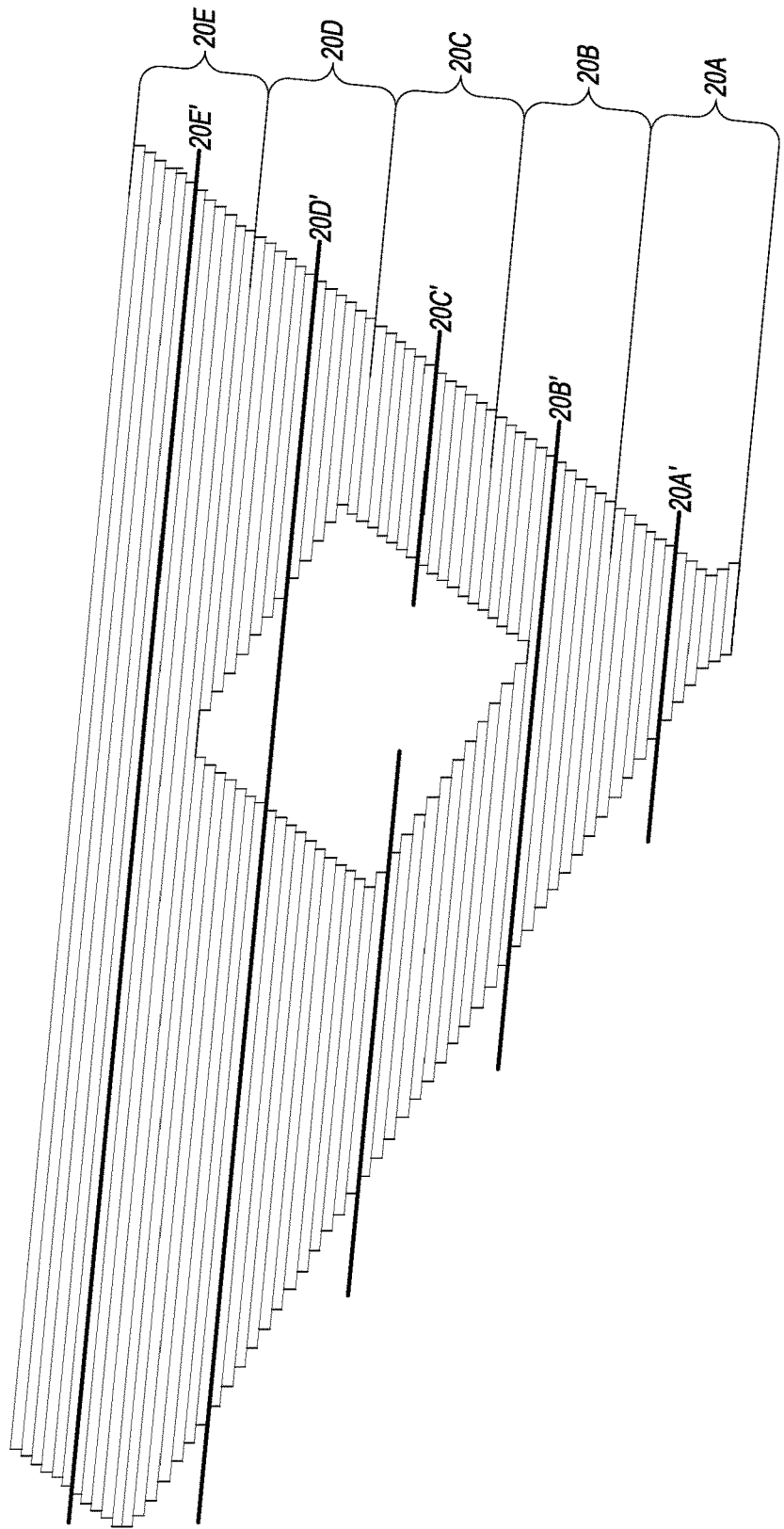
FIG. 1A illustrates a series of courses of composite material on a generally flat form.

With reference to FIG. 1, an embodiment of the system 10 is illustrated. The system 10 can include a computer system, such as a general purpose computer, that includes a processor and memory. The system 10 can receive information related to the dimensions or other aspects of a component to be produced, such as by accessing a storage element 14 (e.g., a database) and/or as an input from a user. The system 10 can use that information to determine instructions for creating the component and can output such instructions to an AFP machine 12 and/or can control the AFP machine 12. The AFP 12 machine can be a conventional AFP machine (e.g., one that is not specifically designed to use the inventions disclosed herein). In certain embodiments, the system 10 can include computer aided manufacturing (CAM) software 10A, which can interface with, and provide instructions to, software on the AFP machine to control application of the composite material. In some implementations, the system 10 includes other software components, such as course generation software 10B, flared path software 10C, and gap filling software 10D, each of which are discussed in more detail below.

The AFP machine 12 can apply layers (also called plies or sequences) of composite material to a surface representative of a desired shape. By stacking numerous layers on top of each other on the form, the component can be produced. For example, certain components are built-up from at least 5, 10, 25, 50, or more layers. Typically, the component is then cured (e.g., by heating in an oven) to produce a unified piece.

Generally, each layer is produced by applying several courses 20 (e.g., rows or swaths) of the composite material to the surface (also called a form). For example, the layer shown in FIG. 1A includes courses 20A-E, with respective centerlines 20A'-20E'. Typically, it is beneficial for the courses to be generally parallel to each other in a particular layer. This is because each course of the composite material generally has strength along a particular axis (e.g., the longitudinal axis of the course), so aligning the courses in generally parallel rows allows the strength of those courses to work together along the axis. The courses in different layers can be oriented in different axes, which can aid in providing strength in many or all directions. For example, a first layer can be oriented at about 0° relative to a reference axis on the component, a second layer can be oriented at about +45°, a third layer can be oriented at about −45°, and a fourth layer can be oriented at about 90°.

Figure 1B:
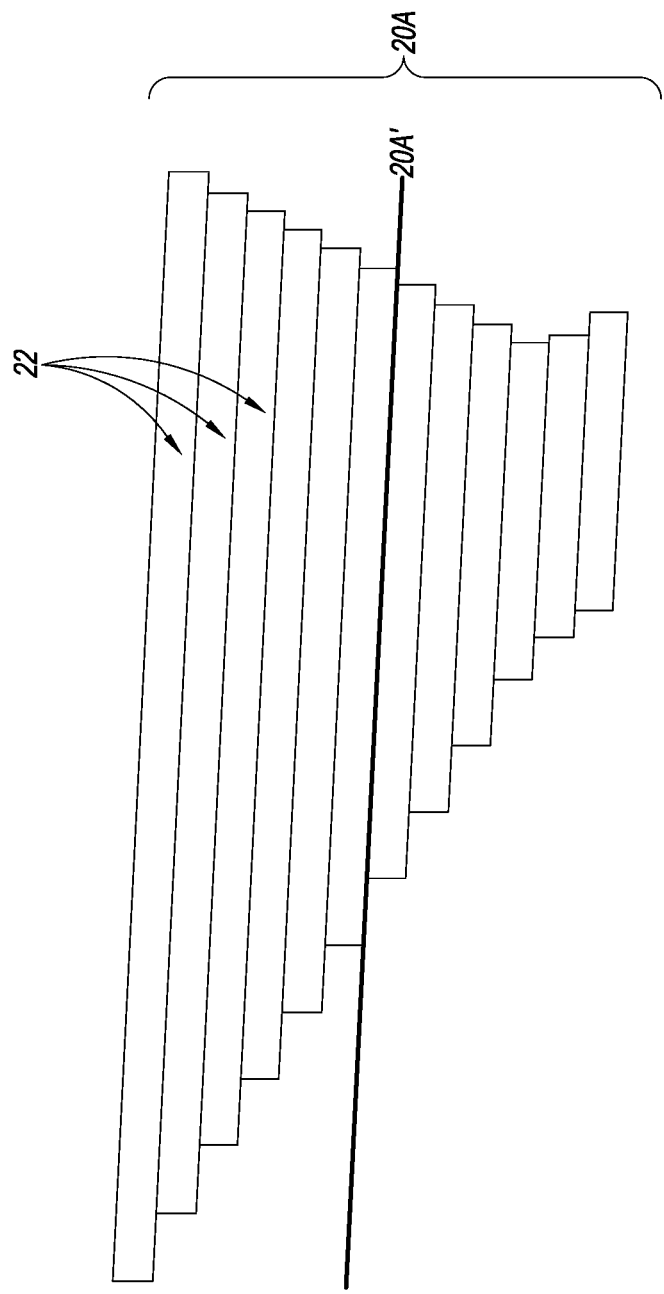
FIG. 1B illustrates one of the courses of FIG. 1A.

Each course can include several individual tows 22 of the composite material. For example, as shown in FIG. 1B, the course 20A includes 12 tows, with 6 tows on each side of the centerline 20A'. In various embodiments, each tow includes fibers (e.g., carbon fibers) impregnated with an epoxy resin.

Figure 1C:
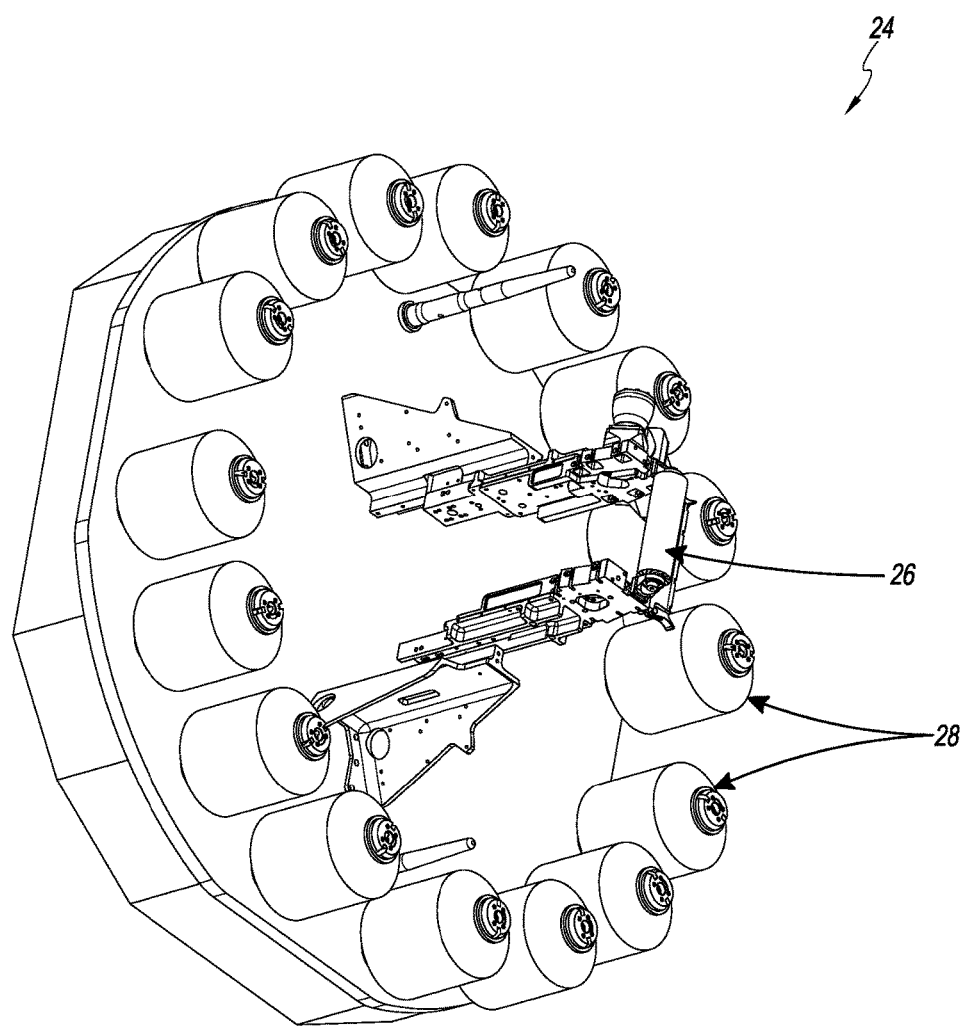
FIG. 1C illustrates a head of an AFP machine.
Figure 1D:
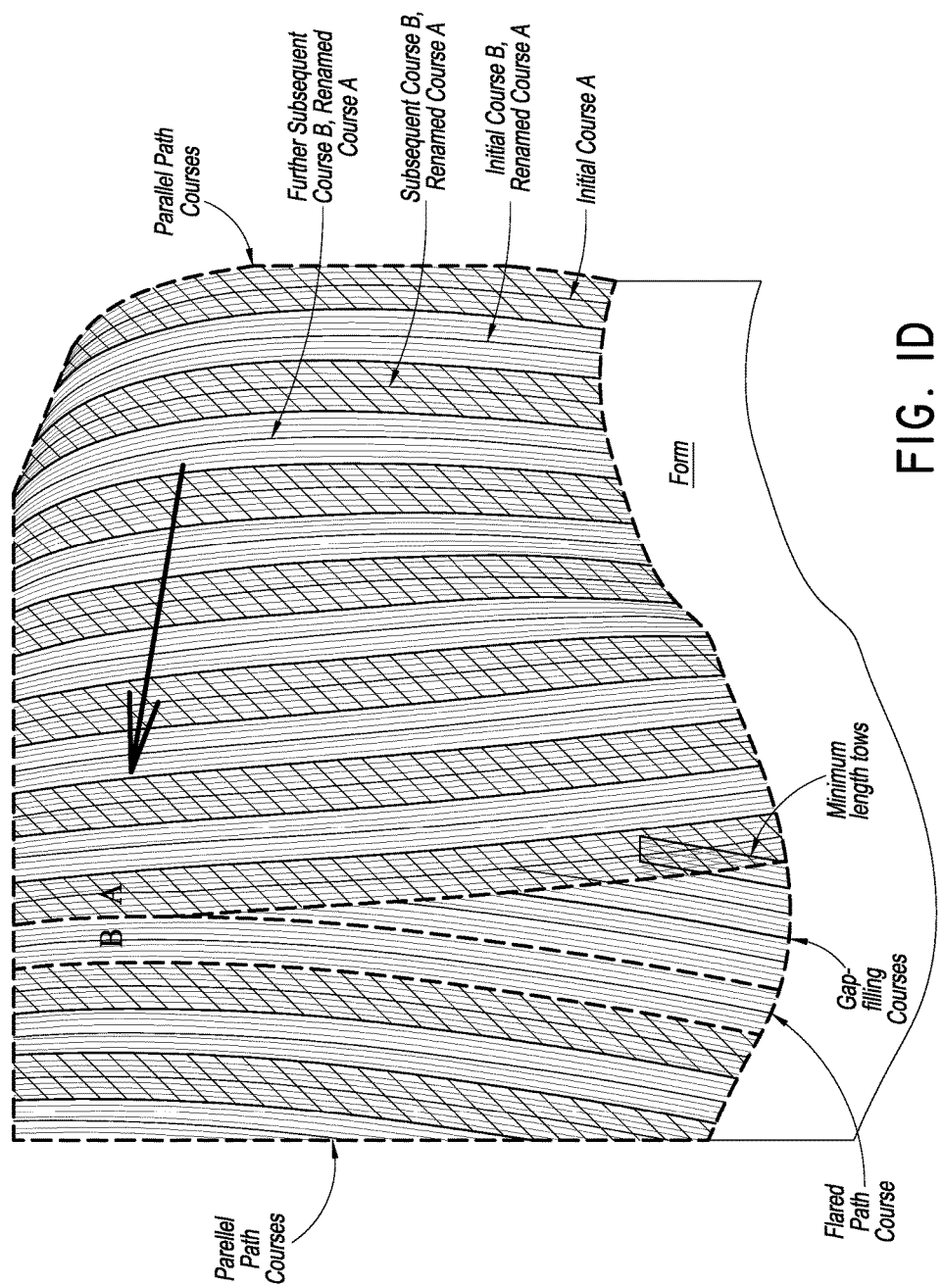
FIG. 1D illustrates a series of the courses of the composite material on a contoured form, the series of courses including parallel path courses, a flared path course, and at least one gap filling course.

The tows are applied by a head 24 of the AFP machine. As shown in FIG. 1C, the head 24 has a roller 26 and one or more tow sources 28, such as spools of the tow material. The tow sources 28 feed the tows to the roller, which compresses the tows onto the form as the head 24 and form move relative to each other (e.g., the head can move and the form can remain stationary, or vice versa). In some embodiments, the head 24 activates or energizes the tows during application, such as by applying heat or UV light.

The head 24 can individually start and stop each of the tows 22. For example, as shown in FIG. 1A, certain tows 22 are stopped and restarted in course 20B and all of the tows 22 are stopped and restarted in course 20C. This can aid in producing voids in the form, such as for windows or other cavities. The head 24 can include a cutting element to cut the end of a stopped tow. However, the length of a tow typically must be at least the distance between the cutting element and the head 24. This is called the "minimum tow length".

As noted above, the system 10 can receive information related to the component to be produced and/or the production operation. For example, the system 10 can receive information regarding dimensions related to the shape and extent of the surface, such as in a matrix. In some embodiments, the information is related to the composite material, such as the width of a course, the width of a tow, the number of tows per course, the minimum bending radius for a tow, or otherwise. In some embodiments, the information is stored on the storage element 14 (e.g., a database). In certain variants, the information is provided as a user input.

The system 10 uses the information to determine paths for application of the courses of composite material over the surface. This can include producing a representation of the surface and/or plotting a plurality of courses over the extent of the surface. On a flat region, determining the course paths is typically fairly straight-forward. This is because, on a flat region, the tows in the course are not required to bend over contours of the form, so are substantially free of bending stress. Thus, each course can simply be applied parallel to the previous course. However, for contoured regions, determining the course paths can be significantly more difficult. This is because, as noted above, when the tows 22 are applied to a contoured surface, one lateral side of each tow experiences compression and the opposite lateral side of each tow experiences tension, which causes stress in the tows. If the stress on a tow is sufficiently high, a flawing event (e.g., wrinkling, tearing, or warping of the tow) can occur, which can reduce the strength of the overall component.

The system 10 can be configured to determine course paths that avoid such flawing events. To do so, the system 10 produces and/or analyzes course paths based on one or more constraints, which are called "steering limitations." In some embodiments, a steering limitation is the maximum amount a tow can bend without incurring a flawing event. For example, the steering limitation can be the minimum radius a tow can be bent around in a horizontal plane for a certain tow length without suffering a tear or wrinkle. In certain variants, for a tow width of approximately 3 mm, the steering limitation can be a radius of at least approximately 250 mm and/or less than or equal to approximately 1000 mm, such as 300 mm, 400 mm, 500 mm, 600 mm, 700 mm, 800 mm, 900 mm, values between the aforementioned values, or other values. In some embodiments, for a tow width of approximately 6 mm, the steering limitation can be a radius of at least approximately 1000 mm and/or less than or equal to approximately 2500 mm, such as 1100 mm, 1300 mm, 1500 mm, 1800 mm, 2000 mm, 2200 mm, 2400 mm, values between the aforementioned values, or other values. In some implementations, for a tow width of approximately 12 mm, the steering limitation can be a radius of at least approximately 5000 mm and/or less than or equal to approximately 10000 mm, such as 6000 mm, 7000 mm, 8000 mm, 9000 mm, values between the aforementioned values, or other values.

The amount of bending that a tow is asked to perform when placed on a curved surface can be expressed as a radius of curvature. For example, for a tow bending on an arc on a plane, the radius of curvature R for the centerline of the tow can be expressed as:

$$R = \frac{W(L+S)}{2(L-S)}$$

Where W is the lateral width of the tow, L is the arc length of the outside of the tow, and S is the arc length of the inside of the tow. In certain implementations, a steering limitation is the minimum radius of curvature that a tow can curve around without incurring a flawing event. For example, for a tow width of approximately 3 mm, the steering limitation can be a radius of at least approximately 250 mm and/or less than or equal to approximately 1000 mm, such as 300 mm, 400 mm, 500 mm, 600 mm, 700 mm, 800 mm, 900 mm, values between the aforementioned values, or other values. As another example, for a tow width of approximately 6 mm, the steering limitation can be a radius of at least approximately 1000 mm and/or less than or equal to approximately 2500 mm, such as 1100 mm, 1300 mm, 1500 mm, 1800 mm, 2000 mm, 2200 mm, 2400 mm, values between the aforementioned values, or other values. As a further example, for a tow width of approximately 12 mm, the steering limitation can be a radius of at least approximately 5000 mm and/or less than or equal to approximately 10000 mm, such as 6000 mm, 7000 mm, 8000 mm, 9000 mm, values between the aforementioned values, or other values.

Some embodiments vary the steering limitation with a factor of safety. This can add a buffer between the stress actually experienced by the tows on the plotted paths and the stress the tows could theoretically tolerate without incurring a flawing event. In some embodiments, the factor of safety increases the steering limitation value, such as when the steering limitation is based on a radius of curvature. In some variants, the factor of safety decreases the steering limitation value, such as when the steering limitation is based on a minimum bend radius of the tows. In certain implementations, the factor of safety alters the steering limitation value by at least about: 5%, 10%, 20%, 30%, 50%, values in between the aforementioned values, or other values. In some embodiments, the factor of safety alters the steering limitation value by between approximately: 1% and 50%, 5% and 30%, 10% and 20%, or other values. The original (e.g., theoretically tolerable) steering limitation plus the factor of safety can be called the "comfortable" steering limitation. For example, when the minimum radius of curvature of the tow is altered by the factor of safety, the result is called the "comfortable" steering radius for the tow. In various implementations, the maximum amount a tow can bend, the minimum radius of curvature of a tow, the factor of safety, and/or the comfortable steering radius are provided to the system 10 from the storage element 14 and/or as a user input.

An example of a series of courses on a contoured surface is illustrated in FIG. 1D. For purposes of presentation, alternating courses are cross-hatched. As indicated in the description below, which references back to certain aspects of FIG. 1D, the system 10 can determine paths for applying courses of the composite material. As shown, the system 10 can determine a plurality of parallel course paths, such as when the paths comply with the steering limitations. As also illustrated, the system 10 can provide an adjusted path (a flared path) when a steering violation is detected. Because the flared path diverges from the parallel paths, a gap is formed, which the system 10 can provide additional paths to fill. After the flared path and/or the gap filling paths, the system 10 can continue providing additional parallel paths—until another steering violation is detected and the process begins again.

Figure 2:
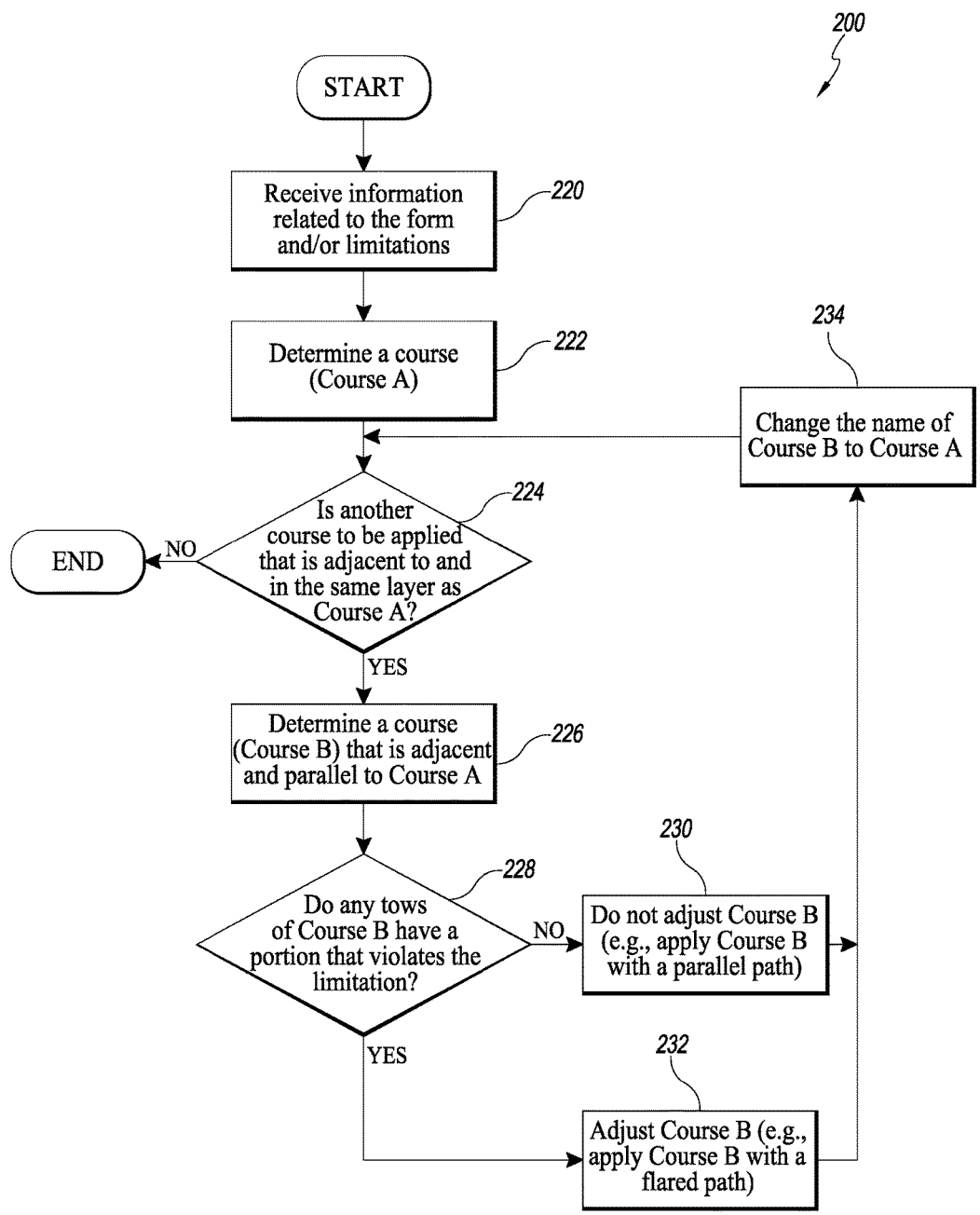
FIG. 2 illustrates a method of generating course paths.

Course Generation (FIG. 2)

FIG. 2 illustrates a process 200 of determining one or more course trajectories for the application of composite material to a surface. The process 200 may be implemented within the course generation software component 10B shown in FIG. 1. In Block 220, the process 200 begins with the system 10 receiving application information. The information can be related to the surface to which the composite is to be applied, such as the dimensional data of the surface, a three-dimensional model of the surface, or otherwise. The information can also be related to the composite material to be applied, such as the type of material being applied (e.g., resin impregnated carbon fibers), the width of a course, the width of a tow, the number of tows per course, or otherwise. In some implementations, the information includes a steering limitation, such as a minimum radius of curvature for an individual tow. The system 10 can receive the information from the storage element 14, as a user input, or a combination of both.

In Block 222, the process 200 determines an initial course, called Course A, on the surface. Course A is along a trajectory that is known to comply with the steering limitations. For example, Course A may be on a generally flat or gently curved portion of the surface, such that the material can be steered over that portion without incurring a failure. In certain embodiments, after Course A has been determined, it can be recorded in the storage element 14.

In Block 224, the process 200 determines whether an additional course is to be applied to the surface adjacent to Course A and in the same layer as Course A. The process 200 ends if the answer is negative, such as if the extent of the surface has been covered with courses. However, if the answer is affirmative, then the process 200 continues to Block 226, in which the system 10 plots another course (called Course B) on the surface. Course B is plotted as adjacent to Course A and generally parallel to Course A. In some embodiments, Course B is on the left side of Course A, but in other embodiments, Course B is on the right side of Course A.

In Block 228, the system 10 analyzes Course B and determines whether any of the tows in Course B violate the steering limitation. For example, the system 10 can analyze each tow and determine whether any of the tows would be required to bend or flex more than is allowable. In some embodiments, the system 10 determines whether one or more tows would traverse a curve that is less than the minimum steering radius of the composite material.

If no tows violate steering limitation in Block 228, then the process 200 proceeds to Block 230, in which Course B is deemed a "safe" course and/or is recorded in the storage device 14. As shown, the process 200 continues to Block 234, in which Course B is renamed Course A. The process 200 then loops back to Block 224 to determine a new Course B. This can allow the system 10 to incrementally determine a plurality of courses that are generally parallel to each other and in the same layer as each other. Thus, such a series of courses can be called "parallel path" courses. Provided the answer to Block 228 continues to be negative, then the process 200 continues adding parallel path courses across the surface until the extent of the surface has been covered by the courses, thereby making the answer to Block 224 negative and ending the process 200.

An example of the parallel path courses is shown in the right hand side of FIG. 1D, which is an example of a series of courses on a contoured surface. For purposes of presentation, alternating courses are shaded and the arrow pointing from right to left indicates the direction of progression of each additional course across the surface. As shown, beginning on the far right of the figure, the layer includes Course A, which is a steerable course. The system 10 has generated a Course B that is just to the left of Course A, as well as generally parallel to and in the same layer as Course A. Because the system 10 determined that the Course B did not incur any steering violations, the name of the Course B was changed to Course A, and the process continued. Additional courses continued to be added were across the width of the surface, with each additional course progressing to the left of the previous course.

With reference again to FIG. 2, if at least one tow violates a steering limitation in Block 228, then a flawing event is possible and the process 200 proceeds to Block 232. To avoid, or at least reduce the chance of, the flawing event occurring, Block 232 can call a sub-routine process 300 which creates a flared path course, as is discussed below in connection with FIG. 3.

In various embodiments, after Block 232, the process 200 continues to Block 234, in which Course B is renamed Course A. The process 200 then loops back to Block 224 to determine a new Course B. The loop of Blocks 224-234 can be repeated until the extent of the surface is covered with courses of the composite material, at which point the query to Block 224 is negative and the process 200 ends.

Figure 3:
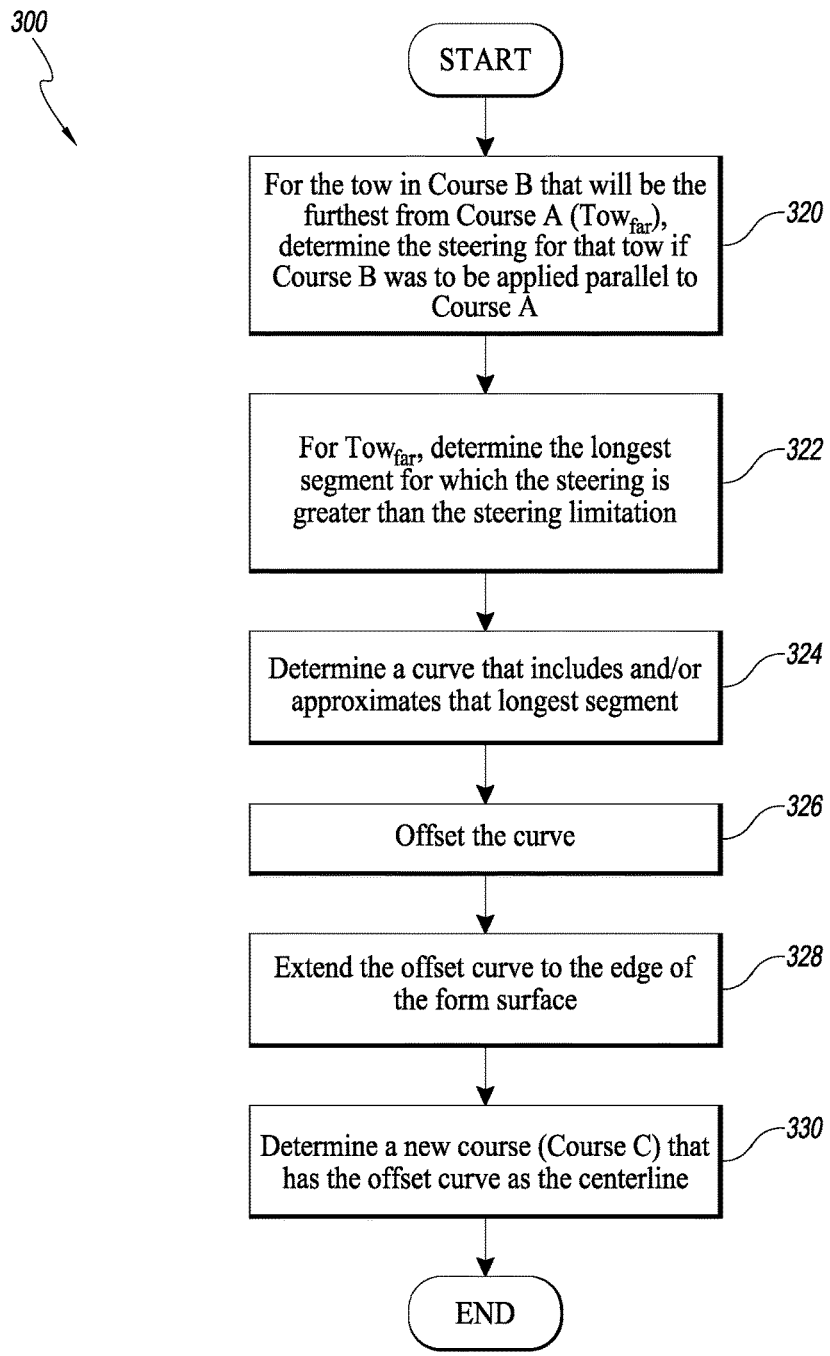
FIG. 3 illustrates a method of determining a flared path.
Figure 3A:
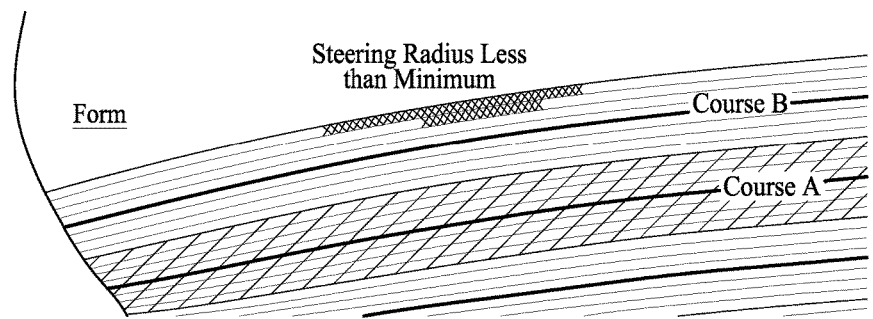
FIG. 3A illustrates a course path that has been determined to violate a steering limitation.
Figure 3B:
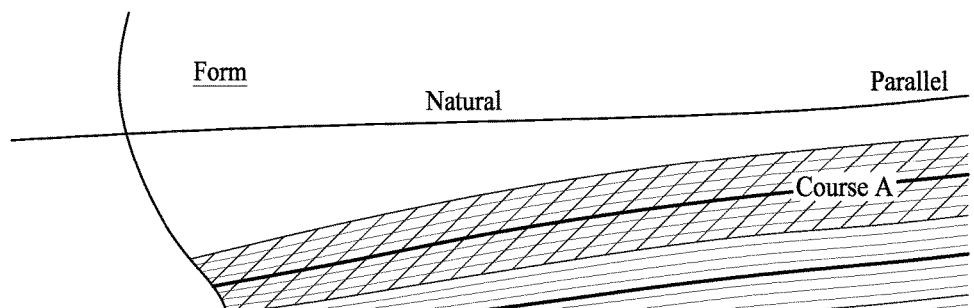
FIG. 3B illustrates an example of a curve that follows a more natural trajectory than the course path of FIG. 3A.
Figure 3C:
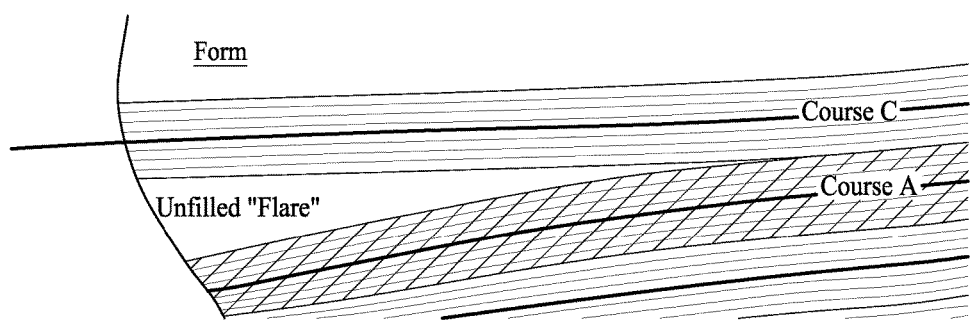
FIG. 3C illustrates an example of a flared path along the curve of FIG. 3B.

Flared Path (FIGS. 3-3C)

FIG. 3 illustrates the sub-routine process 300 for determining a flared path for a course of the composite material. The process 300 may be implemented within the flared path software component 10C shown in FIG. 1. As discussed above, the process 300 applies when the system 10 has determined that the Course B determined in Block 226 of the process 300 would result in at least one tow violating the steering criteria.

The process 300 begins at Block 320, in which the system 10 analyzes the tow within Course B that is the furthest spaced apart from Course A. This tow, called tow$_{far}$, typically is the tow that is opposite the tow that is directly adjacent to Course A. The process 300 includes determining the steering for tow$_{far}$ for the path of Course B determined in Block 226 of the process 200 (generally parallel and adjacent to Course A). As shown in FIG. 3A, tow$_{far}$ can include at least one steering violation.

As shown in FIG. 3, in Block 322, the system 10 determines the longest segment of tow$_{far}$ that complies with the steering limitations. For example, the system 10 can determine the longest segment along the longitudinal axis of tow$_{far}$ that does not violate the steering limitations. In Block 324, the process 300 includes determining a curve that includes and/or approximates the aforementioned longest segment of tow$_{far}$.

In Block 326, the system 10 offsets the curve relative to Course A. For example, the curve can be laterally offset (e.g., spaced apart) from Course A in the direction of Course B. In certain embodiments, the curve is offset by an amount that is a function of the width of Course B and/or the width of tow$_{far}$. For example, the curve can be offset by approximately ½ of the width of the tow$_{far}$ plus ½ the width of Course B.

In Block 328, the curve is extended to the edges of the form. An example of this is shown in FIG. 3B. Typically, the result of the extended curve will be a more "natural" path along the surface of the form compared to the path of Course B determined in Block 226. A "natural" path (also called a "geodesic" path) is a path along a curved surface on which both edges of a tow are the same length as the tow proceeds across the curved surface. A tow will generally assume a natural path if laid on the surface and allowed to drape on the surface with no guidance.

In Block 330, the system 10 determines a new course trajectory, called Course C, that is used in place of Course B. In various embodiments, Course C has the extended curve from Block 328 as its centerline. Typically, Course C has a more natural path than Course B, and is thus more steerable than Course B. This can avoid, or at least reduce the chance of, the potential flawing event determined in Block 228 of the process 200. The process 300 then ends.

In several embodiments, Course C has a flared path. This can include a first portion that is generally parallel to Course A and a second portion that diverges from Course A. An example of such a course is shown in FIGS. 1D and 3C. However, the flared path of Course C creates a gap between Courses A and C in which composite material is missing. As shown, the gap can have a generally wedge-shaped or triangular peripheral shape. A process for filling this gap is discussed below.

Figure 4:
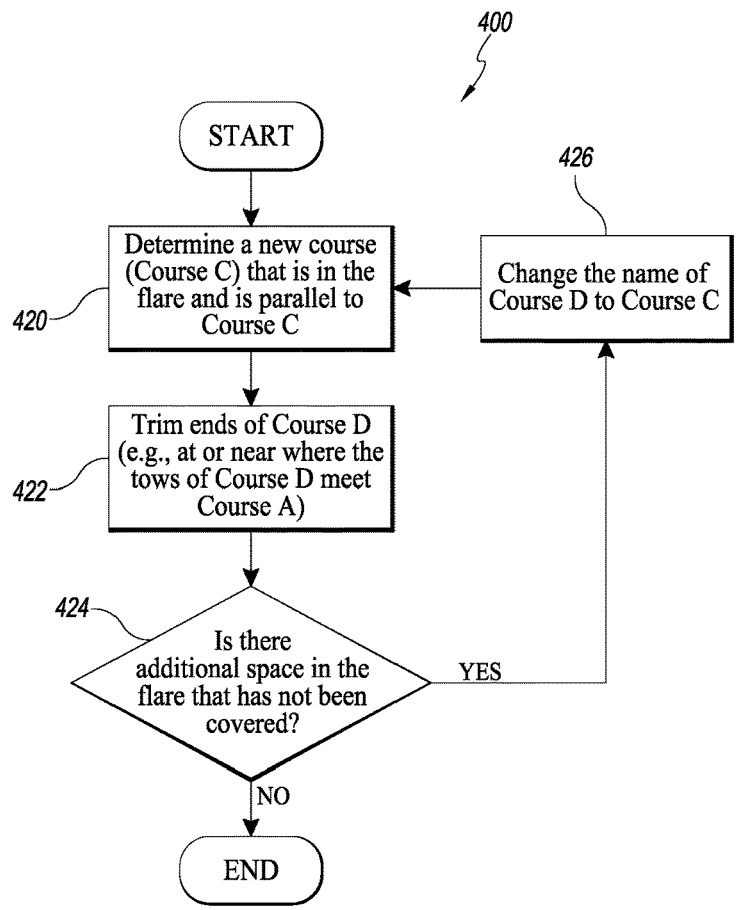
FIG. 4 illustrates a method of filling a gap between a flared path and a non-flared path.
Figure 4A:
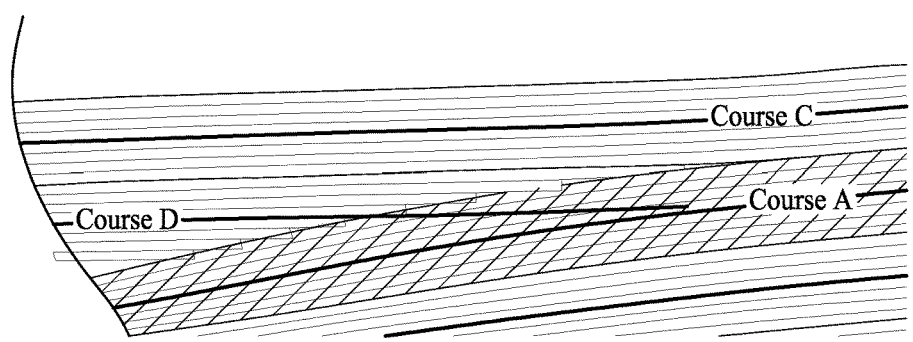
FIG. 4A illustrates an example of a gap filling course path.

Filling the Gap (FIGS. 4 and 4A)

In various embodiments, after the process 300, the system 10 calls a further sub-routine process 400, which is related to filling the gap between Course A (the non-flared path course) and Course C (the flared path course). In various embodiments, the process 400 involves adding one or more courses of the composite material in the gap. The process 400 may be implemented within the gap filling software component 10D shown in FIG. 1.

As shown in Block 420, the process 400 begins with the system 10 determining a new course, called Course D, located in the gap. In some embodiments, Course D is generally parallel to Course C (the flared path course) and adjacent to Course C. Course D can extend from an end of Course C (e.g., the edge of the form) to an intersection between Course D and Course A (the non-flared path course). An example of this is shown in FIG. 4A.

In Block 422, the ends of some or all of the tows in Course D are cut. For example, as shown in FIG. 4A, the system 10 can instruct the AFP machine to cut the ends of the tows positioned at the intersection of Course D and Course A. In some embodiments, the tow ends of Course D are cut such that the composite material of Course D does not overlay the composite material of Course A. This can aid in maintaining Courses A and D in a single layer.

In Block 424, the process 400 determines whether there is additional space in the gap that has not yet been filled with composite material, and for which it is desirable to fill that additional space with composite material. If all of the space in the gap has been filled, or if the remaining unfilled space in the gap is a region in which no composite material is to be applied (e.g., if the remaining unfilled space is a space for a window or other desirable unfilled region in the layer), then the process 400 ends.

However, if unfilled space remains in the gap, and composite material is to be applied to that unfilled space, then the process moves to Block 426, in which the name of Course D is changed to Course C. The process 400 then loops back to Block 420. The process 400 determines a new Course D, cuts the ends of that new Course D relative to Course A, and queries again whether there is yet further space in the gap that has not yet been filled with composite material and for which it is desirable to fill that additional space with composite material. The loop of Blocks 420-426 can be repeated until the unfilled space in the gap has been filled at which point, as noted above, the process 400 ends.

In alternate embodiments, in Block 420, the system determines a Course D that is generally parallel to Course A (the non-flared path course) and adjacent to Course A. Course D can extend from an end of Course A (e.g., the edge of the form) to an intersection between Course D and Course C (the flared path course). In such embodiments, in Block 426, the name of Course D is changed to Course A before the process loops back to Block 420.

In various embodiments, after the process 400 has ended, the system 10 returns to the process 200 discussed above. For example, after the process 400 has ended, the system 10 can return to Block 232 and then proceed to Block 234, in which the name of Course B is changed to Course A. The process 200 then loops back to Block 224 to determine whether further courses of the composite material are to be applied to the surface. Thus, the processes 200, 300, and 400, can automatically determine paths for courses, determine when a steering violation will occur, determine a flared path to avoid such a violation, and fill-in a gap left between the flared path and non-flared path courses. This can allow the system 10 to automatically determine steerable courses of the composite material across the extent of the surface— even on highly contoured forms.

Figure 5:
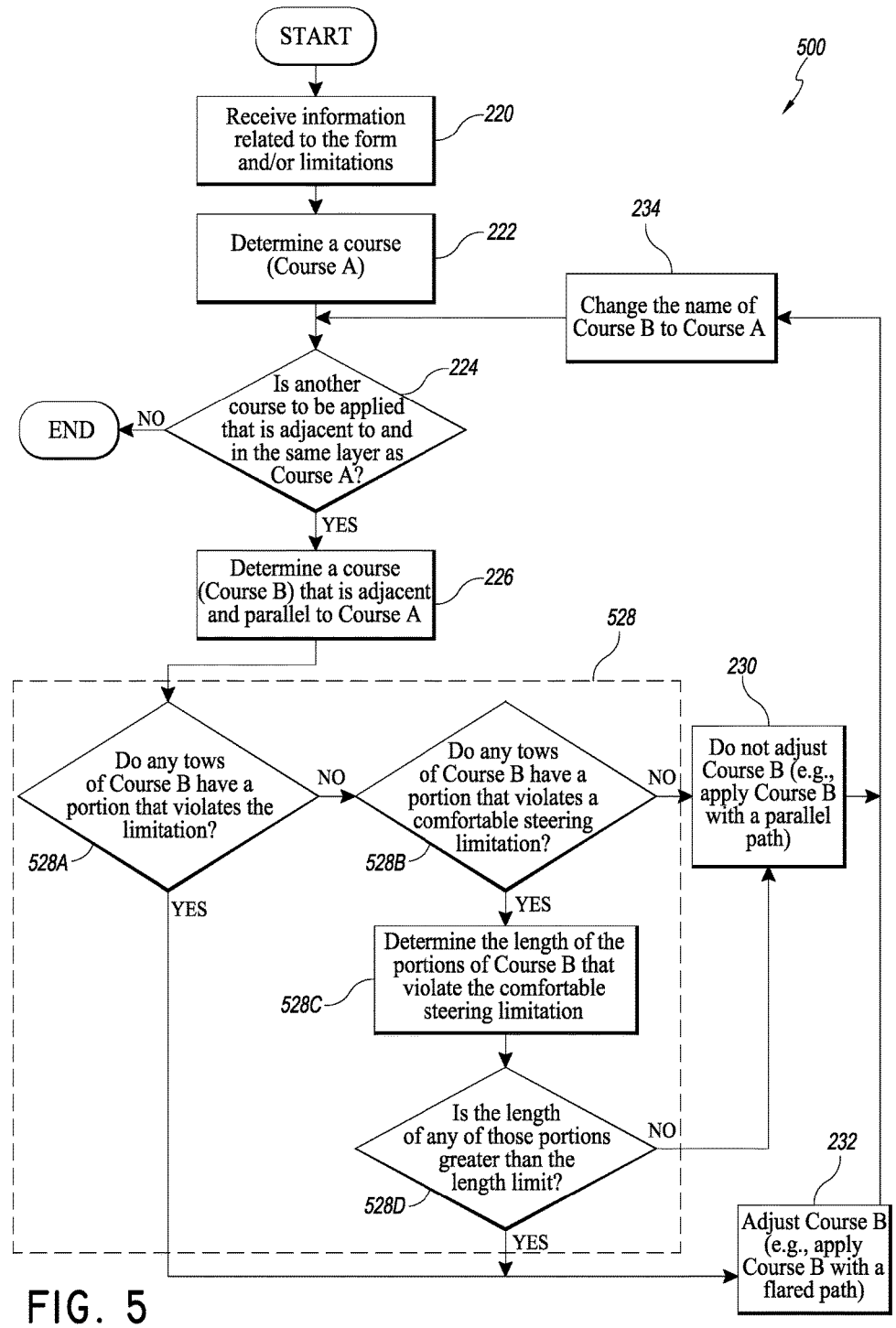
FIG. 5 illustrates a method for generating course paths that includes compensation for minor steering violations.
Figure 6:
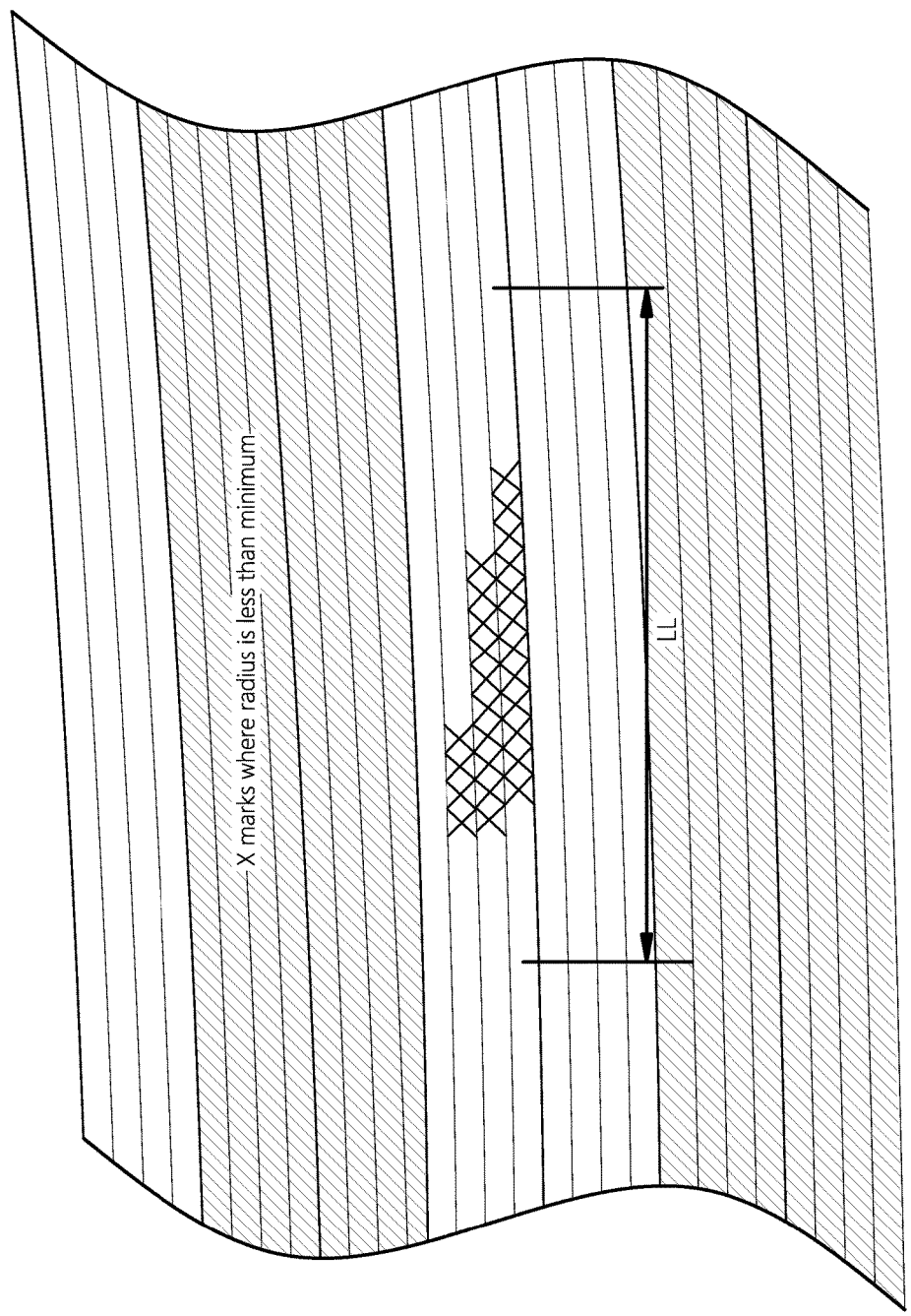
FIG. 6 illustrates an example of tows with minor steering violations.

Short Steering Violations (FIGS. 5 and 6)

In some embodiments, the system 10 permits minor steering violations in applying the courses of composite material. For example, in certain variants, if a course's steering trajectory would subject one or more tows to a curve that is less than the comfortable steering radius of the tows (the minimum radius of curvature of the tows plus a factor of safety) yet greater than the minimum radius of curvature of the tows, the system 10 allows the course to follow a parallel path rather than a flared path. This can reduce or avoid applying flared path courses for minor steering violations and/or can reduce or avoid applying of short lengths of tow, either of which can increase the application rate of the courses to the surface.

A course of the composite material in the band between the comfortable steering radius of the tows and the minimum radius of curvature of the tows is said to be in the "danger zone." This is because the tow is being flexed to such an extent that it is encroaching on the buffer provided by the factor of safety. In some implementations, the system 10 permits a tow to be in the danger zone for only a limited length along the surface. For example, while in the danger zone, the tow can be applied to the surface for a length that is less than or equal to about: 10 mm, 25 mm, 50 mm, 100 mm, 200 mm, values between the aforementioned values, or other values. In some implementations, the length that the tow is allowed to be in the danger zone is provided to the system 10 from the storage element 14 and/or as an input from a user.

FIG. 5 illustrates a process 500 that permits minor steering violations in applying the courses of composite material. The process 500 may be implemented within the course generation software component 10B shown in FIG. 1. In many aspects, the process 500 is identical to the process 200 discussed above. For example, as shown, the process 500 includes Block 220 for receiving information related to the surface, the composite material to be applied, and one or more limitations. The process 500 also includes Block 222, in which the system 10 determines an initial course (Course A). The process 500 further includes Block 224, which determines whether additional courses of the composite material are to be applied adjacent to and in the same layer as Course A. Moreover, the process 500 includes Block 226, in which the system 10 determines a course (Course B) that is generally parallel to and adjacent to Course A.

As shown, rather than Block 228 in the process 200, the process 500 includes a decision logic 528 for determining whether to adjust Course B. The decision logic 528 begins with Block 528A, which determines whether the trajectory of Course B would subject one or more tows to a curve that is less than the minimum radius of curvature of the tows. If the answer is affirmative, then the process 500, at Block 232, calls the flared path and gap filling sub-routines 300, 400, as discussed above.

If the determination in Block 528A is negative, then the process 500, at Block 528B, determines whether the trajectory of Course B would subject one or more tows to a curve that is less than the comfortable steering radius of curvature of the tows. If the answer is affirmative, then the process 500 moves to Block 528C. In Block 528C, the system 10 determines the length of the portions of Course B with a steering radius that is less than the comfortable steering radius. The process 500 then moves to Block 528D, which determines whether the length of any of the portions of Course B with a steering radius that is less than the comfortable steering radius are greater than a length limitation. If the answer is affirmative, then the process 500 moves to Block 232. However, if the determination in either of Blocks 528B and 528D is negative, then the process continues to Block 230, which permits Course B to be applied along a parallel path. As discussed above, after Block 230 and Block 232, the name of Course B is changed to Course A in Block 234. The process then loops back to Block 224.

With reference to FIG. 6, in certain embodiments, a steering radius that is smaller than a minimum radius (e.g., the comfortable steering radius) may be permitted and/or a parallel path course may be applied. For example, a course that includes a tow with a steering radius that is smaller than the minimum radius steering radius is allowed if the length of the steering violation is of short duration, such as less than a length limitation LL (e.g., specified by a user). In some implementations, if an "average" radius of some or each of the tows, as determined over the length limitation LL, is greater than the minimum radius, then the course is permitted. This can be the case even though the steering radius of one or more of the tows may briefly drop below the minimum radius. An example of this is shown in FIG. 6, in which locations with a steering radius that is less than the minimum radius are marked with an "X." In that illustrated example, the length of the steering violation (e.g., the longitudinal length of the course along which the Xs are present) is less than the length limitation LL, so the minor steering violation allowable. Some variants determine the average radius R with the equation:

$$R = \frac{W(L+S)}{2(L-S)}$$

Where W is the lateral width of the tow, L is the arc length of the outside of the tow, and S is the arc length of the inside of the tow. In certain implementations, a parallel path course will be applied even if the radius of one or more of the tows is less than the minimum radius, provided that such a steering violation occurs over a length that is less than or equal to the length limitation LL. In some variants, the length limitation LL is measured along and/or relative to the longitudinal centerline of the course (e.g., such as the centerlines 20A'-20E' in FIG. 1A). In certain embodiments, the length limitation LL is a value in the range of between about 100 mm and about 200 mm.

Temperature Compensation

Certain types of composite materials can be affected by temperature. Typically, as the temperature increases the flexibility and/or bendability of the material increases, and as the temperature decreases the flexibility and/or bendability of the material decreases. Moreover, the composite material may include an adhesive on the side that contacts the surface (to aid in maintaining the material in place) that can also be affected by temperature. For example, the bonding characteristics of the adhesive generally increase as temperature increases.

The tows of composite materials are generally applied to the surface in a heated state, such as by a heating element on the head of the AFP machine. This can increase the flexibility and/or bendability of the tows and can increase the adhesive characteristics (e.g., tackiness) of the adhesive at the time of application to the surface. However, as the tows cool, they can become less flexible and/or bendable and the adhesive can become less tacky. This can result in a flawing event in the tows that occurs some time period after the initial application. To avoid such a problem, some implementations of the system 10 can compensate for changes in temperature. For example, the system 10 can change the steering limitation by a factor of safety. This can reduce the likelihood of a tow violating the steering limitation after it has cooled. In some implementations, the factor of safety is at least about: 5%, 10%, 20%, 30%, 50%, values in between the aforementioned values, or other values of the steering limitation value. In some embodiments, the factor of safety is between: approximately 1% and approximately 50%, approximately 5% and approximately 25%, approximately 10% and approximately 15%, values in between the aforementioned values, or other values.

Some implementations of the system 10 include one or more temperature sensors. For example, the system 10 can include sensors that measure the ambient temperature, temperature of the form, temperature of one or more spools or otherwise. In some embodiments, the system 10 varies the factor of safety as a function of temperature. For example, as the temperature of the form decreases, the factor of safety increases.

Other Features

In various embodiments, the system 10 can include one or more computers or computing devices that implement the various functions described herein under the control of program modules stored on one or more non-transitory computer storage devices (e.g., hard disk drives, solid state memory devices, etc.). Each such computer or computing device typically includes a hardware processor and a memory. Where the system 10 includes multiple computing devices, these devices may, but need not, be co-located. In some cases the system may be implemented on cloud-based or shared computing resources that are allocated dynamically. The system 10 may be connected to the AFP machine via a network connection (wired or wireless) or any other type of link that supports communications. In some variants, the system 10 is implemented on the AFP machine 12. The processes and algorithms described herein may alternatively be implemented partially or wholly in application-specific circuitry, such as Application Specific Integrated Circuits and Programmable Gate Array devices. The results of the disclosed processes and process steps may be stored, persistently or otherwise, in any type of non-transitory computer storage such as, e.g., volatile or non-volatile storage.

As noted above, the system 10 can receive various information related to the form, the composite material, or otherwise from the storage element 14 and/or as user inputs. In some implementations, the storage element 14 includes one or more memory devices, such as flash memory, magnetic disk memory, networked or cloud-based memory, or otherwise. The storage element 14 can store the information in a variety of forms, such as in a database. In certain implementations, the storage element 14 includes some of the information (e.g., the dimensional data of the surface) in a computer aided design (CAD) format, which the system 10 can receive and interpret, such as with the CAM software.

The user input can be provided to the system 10 via a user interface. In some embodiments, the user interface includes a graphical user interface, such as an interface implemented on a special or general purpose computer. In certain variants, the user interface includes a keypad and/or buttons operated by the user. For example, the user can provide the minimum steering radius, the comfortable steering radius, and/or the factor of safety by entering such data on a keypad (e.g., on the AFP machine).

In certain implementations, the system 10 uses a three-dimensional model of the contoured surface of the form to make the various determinations in the processes 200-500, such as whether a trajectory over the form will violate a steering limitation. In addition, the system 10 can use a three-dimensional model of the head of the AFP machine head and/or the composite material to emulate or simulate the actions of the AFP machine in applying the tows to the form. In some embodiments, the system 10 (e.g., the processes 200-500) can generate a map or instruction set for applying the courses of composite material to the form. Such instructions can be recorded on the storage element 14 or otherwise. In certain variants, the system 10 interfaces with and/or controls the AFP machine. For example, the system 10 can output the instruction set to the AFP machine to instruct the AFP machine on how to apply the courses to the form, such as by providing the AFP machine the order and arrangement of the courses. In various embodiments, the system 10 instructs the AFP machine where and/or when to move the head. In some implementations, the system 10 can receive inputs from the AFP machine, such as data indicating the status of an application operation, whether an application operation was successfully performed, or otherwise.

In some embodiments, the system 10 is configured to operate without interfacing and/or controlling the AFP machine. For example, the system 10 can generate and/or simulate the application of course paths on the form, without sending (e.g., directly or immediately) such course paths to the AFP machine. This can allow information related to of the composite material application procedure (e.g., the number of parallel path courses, number of flared path courses, estimated time required to apply the material to the form, etc.) to be determined without actually applying the material to the form. Such simulation can also facilitate planning for the manufacture of the component, such as by determining the amount of composite material required to produce the component, the length of time the AFP machine will be occupied producing the component, etc.

The system 10 can be operated iteratively, such as by generating a series of course paths based on a set of constraints (e.g., the contours of the form, the steering limits, etc.) and then generating another series of course paths based on adjustments to the constraints. This can allow the effect of the constraints to be assessed. For example, a generated series of course paths can show that a particular curve or combination of curves on the form is causing flared paths to be created, which in turn is causing an increase in the total time needed to produce the part. Such a curve or combination of curves can be adjusted, and another series of course paths can be generated to assess effect of the adjustment (e.g., whether the number of flared paths was reduced). This can allow the system 10 to be used to increase the manufacturability of the component, manufacturing efficiency, or otherwise. In various embodiments, after a particular series of course paths and corresponding constraints have been found acceptable (e.g., by a user), such course paths can be stored on the storage element 14 and/or sent as instructions to the AFP machine.

Summary

Although the systems and methods have been disclosed in the context of certain embodiments and examples, it will be understood by those skilled in the art that the systems and methods extend beyond the specifically disclosed embodiments to other alternative embodiments and/or uses of the embodiments and certain modifications and equivalents thereof. Various features and aspects of the disclosed embodiments can be combined with or substituted for one another in order to form varying modes of the conveyor. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Some embodiments have been described in connection with the accompanying drawings. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various embodiments and examples of automated fiber placement systems and methods have been disclosed. Although the systems and methods have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow.

The following is claimed:

1. A system for determining temperature-compensated trajectories for the application of courses of tows of composite material to a curved surface using an automated fiber placement machine, the system comprising:
    a temperature sensor configured to detect a temperature;
    a data repository that stores data related to the shape and dimensions of the surface and that stores an indication of a steering limitation, the steering limitation approximately corresponding to a maximum amount a tow can bend without incurring a flawing event in a first state; and
    a computing system comprising one or more computing devices, the computing system adapted to receive data from the data repository and the temperature sensor, the computing system programmed to:
        adjust the steering limitation at least partly based on the detected temperature to obtain a temperature compensated steering limitation, the temperature compensated steering limitation approximately corresponding to a maximum amount a tow can bend without incurring a flawing event in a second state;
        determine a plurality of course trajectories for the application of the tows to the curved surface, each of the course trajectories including one or more tow trajectories;
        identify, from among the tow trajectories, a violating tow trajectory in which the application of the tow to the curved surface would bend the tow more than the temperature compensated steering limitation; and
        adjust the violating tow trajectory to obtain an adjusted tow trajectory.

2. The system of claim 1, wherein the temperature sensor detects the temperature of at least one of: ambient, the curved surface, and one or more spools of the composite material.

3. The system of claim 1, wherein the first state comprises a heated state of the tow and the second state comprises a cooled state of the tow.

4. The system of claim 1, wherein the computing system is programmed to adjust the steering limitation by reducing the steering limitation as the detected temperature decreases.

5. The system of claim 1, wherein the plurality of course trajectories are in the same layer.

6. The system of claim 1, wherein, in the adjusted tow trajectory, the tow complies with the temperature compensated steering limitation.

7. The system of claim 1, wherein the adjusted tow trajectory is comprised in an adjusted course trajectory, and wherein the adjusted course trajectory comprises a flared path trajectory portion.

8. The system of claim 7, wherein, in the flared path trajectory portion, all of the tows diverge from an adjacent one of the course trajectories, thereby creating a gap between the tows in the flared path trajectory portion and the tows of the adjacent one of the course trajectories.

9. The system of claim 8, further comprising determining at least one additional course trajectory to fill at least a portion of the gap, the additional course trajectory being in the same layer as the flared path trajectory portion.

10. A computer implemented method of providing temperature-compensated control of an automated fiber placement machine that is configured to apply a plurality of layers of composite material to a form, each layer including a plurality of courses, each course including a plurality of tows, the method comprising, under the control of one or more electronic processors:
    receiving a steering limitation that approximately corresponds to a maximum amount a tow can bend without incurring a flawing event;
    receiving temperature data;
    adjusting the steering limitation at least partly based on the temperature data to obtain a temperature compensated steering limitation;
    determining a plurality of course trajectories over the form;
    identifying, among the plurality of course trajectories, a violating course trajectory, the violating course trajectory comprising a tow that would violate the temperature compensated steering limitation; and
    adjusting the violating course trajectory to obtain an adjusted course trajectory.

11. The method of claim 10, further comprising instructing the automated fiber placement machine to apply a course of the composite material along the adjusted course trajectory.

12. The method of claim 10, wherein adjusting the steering limitation at least partly based on the temperature data to obtain a temperature compensated steering limitation comprises: adjusting the steering limitation by a factor of safety.

13. The method of claim 10, wherein adjusting the steering limitation at least partly based on the temperature data to obtain a temperature compensated steering limitation comprises: reducing the steering limitation as the temperature data decreases.

14. The method of claim 10, wherein receiving temperature data comprises receiving a temperature of at least one of: ambient, the form, and one or more spools of the composite material.

15. The method of claim 10, wherein receiving temperature data comprises receiving a signal from a temperature sensor.

16. The method of claim 10, wherein the plurality of course trajectories of the composite material are in the same layer.

17. The method of claim 10, wherein, in the adjusted course trajectory, all of the tows comply with the temperature compensated steering limitation.

18. The method of claim 10, wherein the adjusted course trajectory comprises a flared path trajectory portion.

19. The method of claim 18, wherein, in the flared path trajectory portion, all of the tows diverge from an adjacent one of the course trajectories, thereby creating a gap between the tows in the flared path trajectory portion and the tows of the adjacent one of the course trajectories.

20. The method of claim 19, further comprising determining at least one additional course trajectory to fill at least a portion of the gap, the additional course trajectory being in the same layer as the flared path trajectory portion.

* * * * *